(12) United States Patent
Moore et al.

(10) Patent No.: US 12,710,691 B2
(45) Date of Patent: Aug. 18, 2026

(54) ACTIVE ILLUMINATION SYSTEMS

(71) Applicant: Apple Inc., Cupertino, CA (US)

(72) Inventors: Christian I Moore, Cupertino, CA (US); Ravi Teja Sukhavasi, Fremont, CA (US); Taufiq Habib, Sherman, TX (US); Tushar Gupta, Stanford, CA (US); Zhiheng Jia, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 163 days.

(21) Appl. No.: 18/691,430

(22) PCT Filed: Sep. 22, 2022

(86) PCT No.: PCT/US2022/044463
§ 371 (c)(1),
(2) Date: Mar. 12, 2024

(87) PCT Pub. No.: WO2023/049307
PCT Pub. Date: Mar. 30, 2023

(65) Prior Publication Data

US 2024/0411218 A1 Dec. 12, 2024

Related U.S. Application Data

(60) Provisional application No. 63/248,393, filed on Sep. 24, 2021.

(51) Int. Cl.
*G03B 43/00* (2021.01)
*G02B 27/01* (2006.01)
(Continued)

(52) U.S. Cl.
CPC ......... *G03B 43/00* (2013.01); *G02B 27/0172* (2013.01); *G02B 27/34* (2013.01);
(Continued)

(58) Field of Classification Search
CPC .... G03B 43/00; G03B 15/05; G02B 27/0172; G02B 27/34; G02B 2027/0138;
(Continued)

(56) References Cited

U.S. PATENT DOCUMENTS 4,694,186 A * 9/1987 Onoda ...................... G03F 9/70 250/548
5,752,446 A * 5/1998 Squibb ................ B41F 33/0081 348/E5.029
(Continued)

OTHER PUBLICATIONS

International Search Report and Written Opinion from PCT/US2022/044463, Jan. 23, 2023, pp. 1-11.

*Primary Examiner* — Chiawei Chen
(74) *Attorney, Agent, or Firm* — Robert C. Kowert; Kowert, Hood, Munyon, Rankin & Goetzel, P.C.

(57) ABSTRACT

Fiducial patterns that produce diffraction patterns at a camera sensor are etched or otherwise provided on the surface of a cover glass (CG) in front of a camera. An active light source injects light into the cover glass or into a diffractive optical element to strengthen the signal from the fiducial pattern, or alternatively an active light source is used to reflect light off a reflective fiducial pattern on the cover glass, thus requiring fewer frames to capture and process the diffraction pattern caused by the fiducial pattern.

20 Claims, 11 Drawing Sheets

(51) Int. Cl.
*G02B 27/34* (2006.01)
*H04N 23/55* (2023.01)
*H04N 23/56* (2023.01)
*H04N 23/81* (2023.01)

(52) U.S. Cl.
CPC ............. *H04N 23/55* (2023.01); *H04N 23/56* (2023.01); *H04N 23/81* (2023.01); *G02B 2027/0138* (2013.01)

(58) Field of Classification Search
CPC .... G02B 27/0093; G02B 27/32; H04N 23/55; H04N 23/56; H04N 23/81; G06F 3/012; A61B 2090/363; G06V 30/1444; G01R 33/58; G01R 33/5673
See application file for complete search history.

(56) References Cited

U.S. PATENT DOCUMENTS 10,623,727 B1 4/2020 Frevert
11,079,522 B1* 8/2021 Dong ........................ G06T 7/73
11,418,774 B2* 8/2022 Ha ........................ H04N 13/305
2002/0109775 A1* 8/2002 White .................... B23K 26/04 382/141
2002/0187406 A1* 12/2002 Magome ................... G03F 1/78 430/5
2003/0138742 A1* 7/2003 Irie ......................... G03F 7/201 430/311
2005/0032283 A1* 2/2005 Itoga ................. H01L 21/02686 438/149
2008/0250625 A1* 10/2008 Slettemoen ............ B23Q 17/24 29/407.04
2011/0080476 A1* 4/2011 Dinauer ............... G05B 19/401 382/141
2012/0325907 A1* 12/2012 Mueller ................ G06T 7/0004 235/385
2013/0245971 A1* 9/2013 Kusunose ................. G03F 1/24 702/59
2016/0191911 A1* 6/2016 Filhaber ................. G01B 5/012 348/95
2018/0017773 A1* 1/2018 Tomosugi ................. G06T 5/73
2018/0283854 A1* 10/2018 Munro ................. G01C 15/002
2019/0041979 A1* 2/2019 Kirchner ................ B64D 43/00
2020/0090338 A1* 3/2020 Fiala ........................ G06T 7/246
2020/0126203 A1* 4/2020 Lee ......................... G06T 7/001
2020/0209628 A1* 7/2020 Sztuk ................. G02B 27/0176
2020/0209646 A1* 7/2020 El-Ghoroury .......... H04N 13/30
2020/0218075 A1* 7/2020 Petersen ............ G02B 27/0176
2020/0336733 A1* 10/2020 Frevert ................ G02B 26/124
2021/0018657 A1* 1/2021 Tsai ....................... H04N 23/55
2021/0096385 A1* 4/2021 Gupta ...................... G02B 7/14
2021/0176456 A1* 6/2021 Filhaber ................. H04N 23/54
2021/0294106 A1* 9/2021 Meitav ..................... H04N 9/31
2021/0405269 A1* 12/2021 Dong ................... G02B 5/1852
2022/0291082 A1* 9/2022 Fu ........................... G01S 7/481

* cited by examiner

ACTIVE ILLUMINATION SYSTEMS

PRIORITY APPLICATIONS

This application is a 371 of PCT Application No. PCT/US2022/044463, filed Sep. 22, 2022, which claims benefit of priority to U.S. Provisional Patent Application No. 63/248,393, filed Sep. 24, 2021. The above applications are incorporated herein by reference. To the extent that any material in the incorporated application conflicts with material expressly set forth herein, the material expressly set forth herein controls.

BACKGROUND

Fiducial patterns have been used in localization applications. For example, fiducial patterns that produce diffraction patterns at a camera sensor may be etched or otherwise provided on a cover glass (CG) in front of a camera. Conventionally, such fiducial patterns are configured to affect passive light passing through the cover glass to cause diffraction patterns at the camera sensor. However, using passive light has limitations; for example, using passive light may require that hundreds or even thousands of frames be captured and processed to recover the fiducial pattern from the frames.

SUMMARY

Various embodiments of methods and apparatus in which active illumination is provided for fiducial patterns on a transparent glass or plastic material, for example optical elements such as cover glasses used in or with a head-mounted device. Cameras are used to capture multiple images through a glass or plastic element that include diffraction patterns caused by the fiducial patterns. The diffraction patterns from the multiple images can be processed and analyzed to extract information including but not limited to centroids of the fiducial patterns. This information may, for example, be used to estimate location of the fiducial patterns with respect to the cameras, and thus to estimate pose of the glass element with respect to the cameras.

Embodiments of systems are described in which fiducial patterns that produce diffraction patterns at an image sensor (also known as a camera sensor) are etched or otherwise provided on a cover glass (CG) in front of a camera. Conventionally, such fiducial patterns are configured to affect passive light passing through the cover glass to cause diffraction patterns at the camera sensor. However, using passive light requires that hundreds or even thousands of frames be captured and processed. Embodiments may thus use an active light source that injects light into the cover glass or into a diffractive optical element to strengthen the signal from the fiducial pattern, or alternatively that use an active light source to reflect light off a reflective fiducial pattern on the cover glass, thus requiring fewer frames to capture and process the diffraction pattern caused by the fiducial pattern.

Embodiments are described in which a light source and a prism are used to inject light into a cover glass (or alternatively into a diffractive optical element (DOE) embedded in a cover glass). The light may be propagated through the cover glass via TIR. The fiducial pattern may be etched into the camera-facing surface of the cover glass, or alternatively may be provided by a diffuser film. A portion of the light being propagated through the cover glass may exit the cover glass at the etched spots of the fiducial pattern in the glass towards the camera. Light will escape from the etched or diffuser film areas and provide a near field illumination source. In some embodiments, the illumination source may be far field if gratings are used rather than diffuser film.

Embodiment are also described that use a diffractive optical element (DOE), which may be embedded in or on the surface of the cover glass. In these embodiments, light is injected from a light source into the DOE such as a waveguide through an in-couple grating (entrance pupil) and exits the DOE through an out-couple grating (exit pupil) towards the camera. The out-couple grating acts as the exit pupil and thus as the entrance pupil for the camera itself. The DOE may be designed to limit outward light transmission. The fiducial pattern may be etched or printed on the surface of the cover glass at the out-couple grating, or alternatively may be integrated in the out-couple grating.

Embodiments are also described that use a reflective coating on a surface of the cover glass. In these embodiments, a reflective coating on a surface of the cover glass is used to form the fiducial pattern. The coating may be applied on the surface, and laser ablation may be used to remove unneeded portions of the coating, leaving the fiducial pattern. Light from a light source is directed towards the surface, and a portion of the light is reflected off the fiducial pattern towards the camera. Some embodiments may use a retroreflective material as a coating; retroreflective materials have the property of returning directed light beams back to the source.

Even with active illumination, the signal of the fiducial pattern is low, and the fiducial pattern cannot be seen with the naked eye. Using a video stream to integrate the signal over many frames in a stream, the fiducial pattern can be recovered. The fiducial patterns can be created on the cover glass via ink printing and laser ablation, in a laminate applied to the cover glass, or by laser etching of the surface of the cover glass.

Figure 1A:
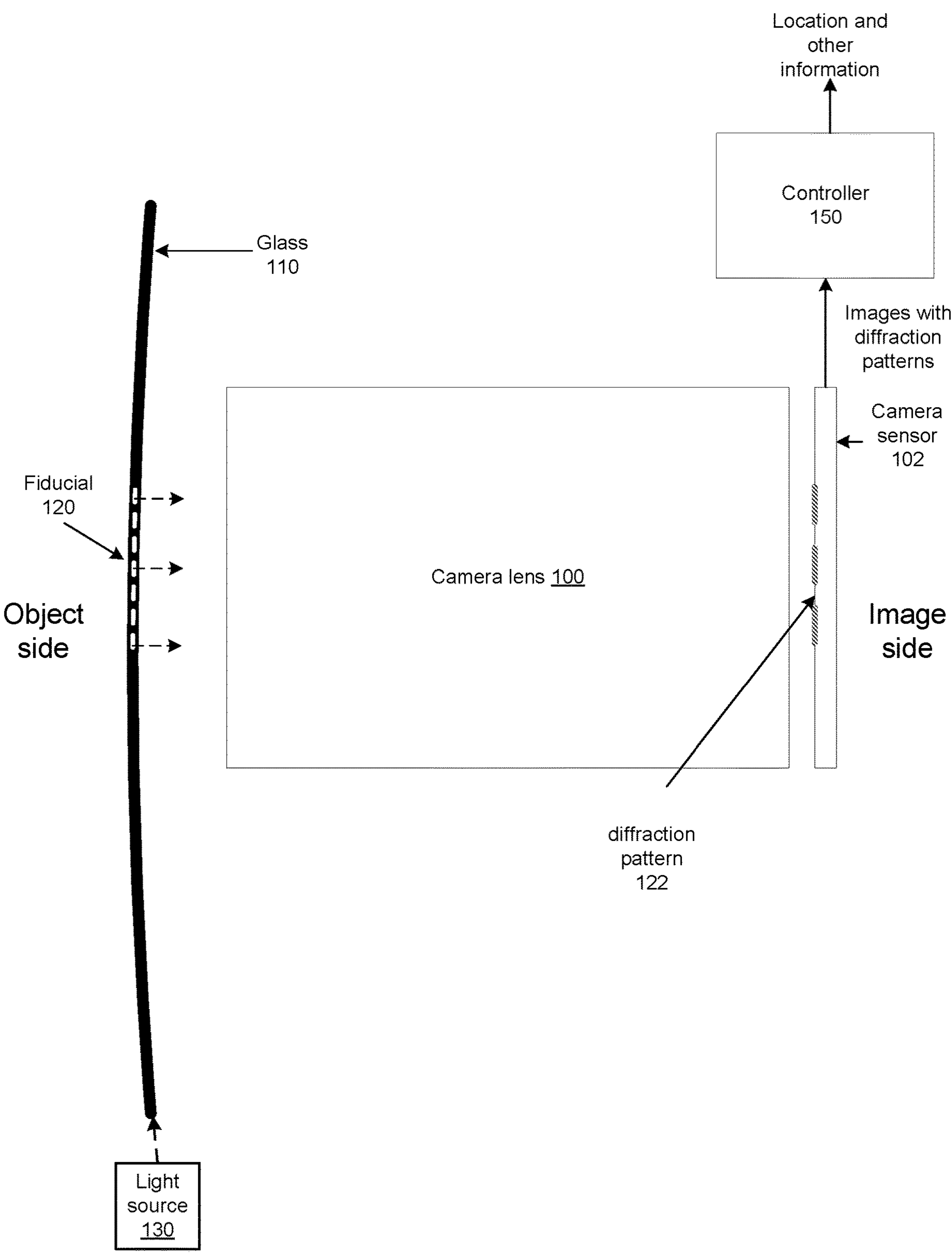
FIG. 1A illustrates a system in which a glass includes a fiducial pattern that causes a diffraction pattern on a camera sensor, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware-for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus in which active illumination is provided for fiducial patterns on a transparent glass or plastic material, for example optical elements such as cover glasses used in or with a head-mounted device. Cameras are used to capture multiple images through a glass or plastic element that include diffraction patterns caused by the fiducial patterns. The diffraction patterns from the multiple images can be processed and analyzed to extract information including but not limited to centroids of the fiducial patterns. This information may, for example, be used to estimate location of the fiducial patterns with respect to the cameras, and thus to estimate pose of the glass element with respect to the cameras.

Embodiments of systems are described in which fiducial patterns that produce diffraction patterns at a camera sensor are etched or otherwise provided on a cover glass (CG) in front of a camera. Conventionally, such fiducial patterns are configured to affect passive light passing through the cover glass to cause diffraction patterns at the camera sensor. However, using passive light requires that hundreds or even thousands of frames be captured and processed. Embodiments may thus use an active light source that injects light into the cover glass, or alternatively reflects light off the cover glass, to strengthen the signal from the fiducial pattern, thus requiring fewer frames to capture and process the diffraction pattern caused by the fiducial pattern.

Embodiments of a near surface active calibration system are described that utilizes a synchronized light source in a reflection or diffraction configuration to route light back into the camera sensor(s). Some embodiments may use a diffractive optical element in or on a curved (or flat) cover glass component to perform active calibration. Some embodiments may use a simple LED and in-couple grating (IGC) near the camera to project light into the camera at opportune times to allow for camera extrinsic and/or intrinsic calibration. Extrinsic generally refers to alignment of the camera within the system and specifically with regard to the cover glass. Intrinsic generally refers to internal calibration of the camera components.

When placing camera sensors behind a transparent surface, it is helpful to know the cameras' relationship to the surface. This information can, for example, be used to correct surface and/or lens induced distortion as well as any shifts of the cameras with respect to the surface. Conventionally, passive markers (referred to as fiducial patterns) on the surface have been used to correct for extrinsic misalignment. However, this passive method requires ideal or nearly ideal external lighting conditions (ambient light) to be met to detect the fiducials. In addition to the lighting requirements, the conventional passive methods may require redundancy in fiducial design to assure at any given time of measurement that a sufficient number of markers are well-conditioned. In embodiment of the active system described herein, these issues may be mitigated because the light is fully under control of the system itself. This has a benefit of assuring detectability of features within a fiducial pattern. In addition, with an active system, new opportunities for fiducial designs, both in the visible and non-visible spectrum, are possible.

Embodiments are described in which a light source and a prism are used to inject light into a cover glass (or alternatively into a diffractive optical element (DOE) embedded in a cover glass). The light may be propagated through the cover glass via TIR. The fiducial pattern may be etched into the camera-facing surface of the cover glass, or alternatively may be provided by a diffuser film. A portion of the light being propagated through the cover glass may exit the cover glass at the etched spots of the fiducial pattern in the glass towards the camera. Vertical cavity surface emitting laser (VCSEL), light-emitting diode (LED), or other light sources may be used, and the light may be in any of various wavelengths including visible, infrared (IR), and near-infrared (NIR) wavelengths. The prism may be a low-cost, high-efficiency incoupling prism, for example a 22.5-degree prism. Light may travel at 45 degrees within the cover glass due to TIR. Light may be recycled from the two end surfaces of the cover glass due to TIR. In some embodiments, critical angle of the cover glass is 41.1 degrees. Light will escape from the etched or diffuser film areas and provide a near field illumination source. In some embodiments, the illumination source may be far field if gratings are used rather than diffuser film.

Embodiment are also described that use a diffractive optical element (DOE), which may be embedded in or on the surface of the cover glass. In these embodiments, light is injected from a light source into the DOE such as a waveguide through an in-couple grating (entrance pupil) and exits the DOE through an out-couple grating (exit pupil) towards the camera. The out-couple grating acts as the exit pupil and thus as the entrance pupil for the camera itself. The DOE may be designed to limit outward light transmission. The fiducial pattern may be etched or printed on the surface of the cover glass at the out-couple grating, or alternatively may be integrated in the out-couple grating. VCSEL, LED, or other light sources may be used, and the light may be in any of various wavelengths including visible, IR, and NIR wavelengths.

Embodiments are also described that use a reflective coating on a surface of the cover glass. In these embodiments, a reflective coating on a surface of the cover glass is used to form the fiducial pattern. The coating may be applied on the surface, and laser ablation may be used to remove unneeded portions of the coating, leaving the fiducial pattern. Light from a light source is directed towards the surface, and a portion of the light is reflected off the fiducial pattern towards the camera. Some embodiments may use a retroreflective material as a coating; retroreflective materials have the property of returning directed light beams back to the source. VCSEL, LED, or other light sources may be used, and the light may be in any of various wavelengths including visible, IR, and NIR wavelengths.

Embodiments of the active methods described herein may work in tandem with passive fiducials (e.g., low light, low motion, low texture). The wavelength of light emitted by the light source may depend on the camera spectrum response (RGB, IR etc.). In other words, the active fiducial illumination method may be used with lights and cameras in different spectrums. Embodiments may be configured to allow ambient light to pass through the cover glass with minimal impact to image quality (MTF reduction or color shifts).

Embodiments may provide high contrast fiducials when compared to passive methods, which enables better detection of the fiducials by computer vision algorithms, and possibly fewer frames than are required for passive methods. Given strong features, computer vision algorithms may be used to calculate camera intrinsics (distortion/focal length) and extrinsics (surface to camera relationship), which can then be used correct for distortion, misalignment, etc. when further processing the images for display.

Some embodiments may leverage timing information (light time travel), commonly known as Time of Flight (ToF), to calculate distance between the surface (cover glass) and one or more cameras.

Some embodiments may allow for the light source to only be activated at opportune times, for example if the device has experienced a significant drop, an IMU of the device triggers on an event (camera shifts/bumps), or a temperature shift that may affect the camera has been detected. Some embodiments may turn on the light source only for a short time (e.g., 1/30 of a second), and may flag the corresponding frame as "disregard" to downstream consumers, allowing some algorithms to ignore the frame. In some embodiment, the light source may be a synchronized light source that is pulsed to match the camera exposure time and to thus reduce power consumption.

As previously noted, some embodiments may use a diffractive optical element (DOE) and/or a retroreflective ink mask. Embodiments may be configured to minimize or eliminate external visible patterns or light transmitted outward from the device. (ID). The light source may generate visible, near-IR or IR (900 nm+) coherent or non-coherent light. Lasers (e.g., VCSELs), LEDs, or other light-emitting technology may be used in various embodiments. In embodiments that include a waveguide (DOE), FTIR or a diffractive grating may be used for transport. The surface (e.g., cover glass) in front of the camera and light source may be curved or flat. The fiducial patterns can be created on the cover glass via ink printing and laser ablation, in a laminate applied to the cover glass, or by laser etching of the surface of the cover glass.

In some embodiments, the signal of the fiducial pattern may be low. Using a video stream to integrate the signal over many frames in a stream, the fiducial pattern can be recovered.

The methods and apparatus described herein may be used in any object localization system, in particular in systems that are within a range (e.g., 0.05 mm-5000 mm) of the camera. Embodiments may, for example, be used for stereo (or more than 2) camera calibration for any product with more than one camera. An example application of the methods described herein is in extended reality (XR) systems that include a device such as headset, helmet, goggles, or glasses worn by the user, which may be referred to herein as a head-mounted device (HMD).

Advantages of the active illumination methods described herein over conventional passive methods may include, but are not limited to, increasing the signal to noise ratio for fiducial detection, reduction or elimination of the dependency on external lighting conditions, being able to operate in specific wavelengths (such as 940 nm), and reducing the number of frames that need to be captured to recover the fiducial pattern and thus reducing time needed to adjust processing based on the relation of the cover glass to the camera.

Another advantage of the active illumination methods described herein may be making it easier to detect contamination or defects (smudges, scratches, etc.) on the cover glass. Since the DOE is relying on total internal reflection (TIR) of the light, areas of abnormalities, such as smudges and scratches, on the cover glass become a delta between what is expected and what is out of ordinary and can be detected. Captured frames can be analyzed to detect these areas, and that information can be used in processing images captured through the cover glass, or in informing the user that the cover glass has a defect such as a smudge.

While embodiments are generally described in relation to applying active illumination for fiducials on a glass in front of a camera, and more specifically to applying the active illumination methods and apparatus to a cover glass of a head-mounted device (HMD), at least some embodiments may also be applied for other components or types of systems. For example, some HMDs may allow for attachable lenses that can be attached to a surface of the cover glass, for example prescription lenses, and at least some of the methods and apparatus described herein could be applied to an attachable lens so that active illumination is provided for fiducials on the attachable lens.

FIG. 1A illustrates a system in which a cover glass or attachable lens includes a fiducial pattern that causes a diffraction pattern on a camera sensor, according to some embodiments. The system may include a camera that includes a camera lens 100 and camera sensor 102 located behind a glass 110 of the system (e.g., a cover glass of a head-mounted device (HMD)). The glass 110 may be, but is not necessarily, curved, and may, but does not necessarily, have optical power. A fiducial 120 may be etched or otherwise applied to the cover glass 110 in front of the camera lens 100. In conventional systems, the fiducial 120 is configured to affect input light from an object field in front of the camera to cause a diffraction pattern 122 at an image plane corresponding to a surface of the camera sensor 102. Images captured by the camera sensor 102 contain a "shadow" that corresponds to the diffraction pattern 122 caused by the fiducial 120. Embodiments of active illumination methods as described herein that use an active light source 130 that injects light into the cover glass 110, or alternatively that reflects light off the cover glass 110, may instead or also be used to strengthen the signal from the fiducial pattern.

The system may also include a controller 150. The controller 150 may be implemented in the HMD, or alternatively may be implemented at least in part by an external device (e.g., a computing system) that is communicatively coupled to the HMD via a wired or wireless interface. The controller 150 may include one or more of various types of processors, image signal processors (ISPs), graphics processing units (GPUs), coder/decoders (codecs), and/or other components for processing and rendering video and/or images. While not shown, the system may also include memory coupled to the controller 150. The controller 150 may, for example, implement algorithms that render frames that include virtual content based at least in part on inputs obtained from one or more cameras and other sensors on the HMD, and may provide the frames to a projection or other display system of the HMD for display. The controller 150 may also implement other functionality of the system, for example eye tracking algorithms.

The image processing algorithms implemented by controller 150 may be sensitive to any distortion in images captured by the camera, including distortion introduced by the glass 110. Alignment of the glass 110 with respect to the camera may be calibrated at an initial time to, and this alignment information may be provided to the image processing algorithms to account for any distortion caused by the glass 110. However, the glass 110 may shift or become misaligned with the camera during use, for example by bumping or dropping the HMD.

In some embodiments, the controller 150 may also implement methods for detecting shifts in the glass 110 post-$t_0$ based on the diffraction pattern 122 caused by the fiducial 120 on the cover glass 110 and on a corresponding known diffraction pattern. These algorithms may, for example, be executed each time the HMD is turned on, upon detecting the presence of an attachable lens, upon detecting a sudden jolt or shock to the HMD, or upon detecting temperature changes that may affect the camera and/or cover glass. Images captured by the camera may be analyzed by controller 150 by applying the known pattern(s) 124 to the image(s) to detect peaks (centroids of sub-patterns within the diffraction patterns) in the images. The locations and arrangements of the detected centroids may then be compared to the calibrated locations for the glass 110 to determine shift of the glass 110 with respect to the camera in one or more degrees of freedom. Offsets from the calibrated locations determined from the shift may then be provided to the image processing algorithms to account for distortion in images captured by the camera caused by the shifted glass 110.

In some embodiments, information may be collected across multiple images and averaged to reduce the signal-to-noise ratio (SNR) and provide more accurate alignment information. Averaging across multiple images may also facilitate using fiducials 120 with low attenuation (e.g., 1% or less attenuation). Further, analyzing one image provides alignment information at pixel resolution, while averaging across multiple images provides alignment information at sub-pixel resolution.

Example fiducials 120 that produce particular diffraction patterns 122 are described. Corresponding known patterns 124, when applied to the diffraction patterns 122 captured in images by the camera, can provide peaks that may be used to detect shifts in the cover glass 110. Note that the example fiducials 120 are given as examples, and are not intended to be limiting.

Figure 1B:
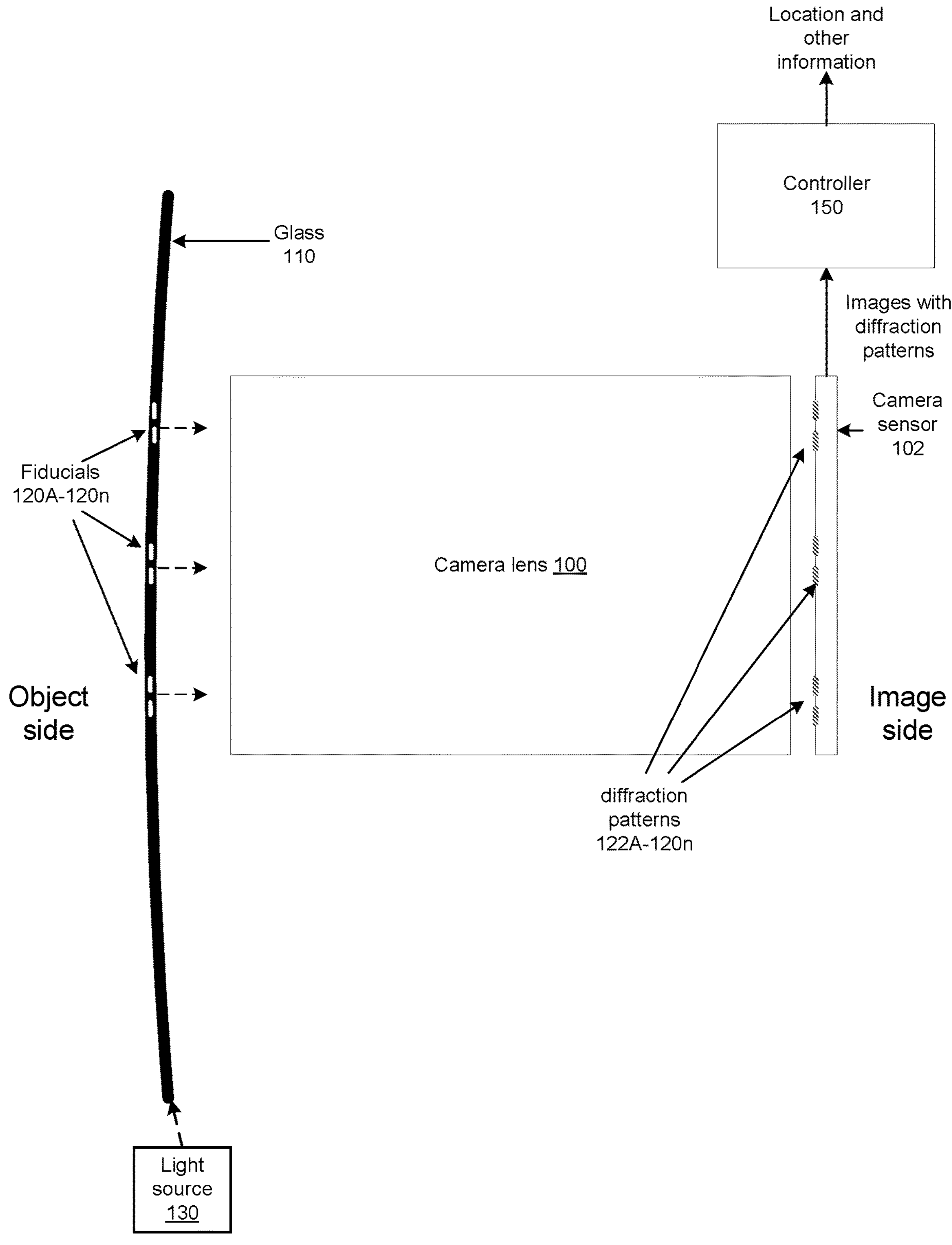
FIG. 1B illustrates a system in which a glass includes multiple fiducial patterns that cause diffraction patterns on a camera sensor, according to some embodiments.

FIG. 1B illustrates a system in which a glass includes multiple fiducial patterns that cause diffraction patterns on a camera sensor, according to some embodiments. The system may include a camera that includes a camera lens 100 and camera sensor 102 located behind a glass 110 of the system (e.g., a cover glass of a head-mounted device (HMD)). The glass 110 may be, but is not necessarily, curved, and may or may not have optical power. Multiple fiducials 120A-120*n* may be etched or otherwise applied to or applied to the glass 110 in front of the camera lens 100. Conventionally, the fiducials 120 are configured to affect input light from an object field in front of the camera to cause diffraction patterns 122A-122*n* at an image plane corresponding to a surface of the camera sensor 102. Images captured by the camera sensor 102 contain "shadows" that correspond to the diffraction patterns 122A-122*n* caused by the fiducials 120A-120*n*. Embodiments of active illumination methods as described herein that use an active light source 130 that injects light into the cover glass 110, or alternatively that reflects light off the cover glass 110, may instead or also be used to strengthen the signals from the fiducial patterns.

Images captured by the camera may be analyzed by controller 150 by applying the known pattern(s) 124 to the image(s) to detect peaks (centroids of sub-patterns within the diffraction patterns) in the image(s). The locations and arrangements of the detected centroids may then be compared to the calibrated locations for the glass 110 to determine shift of the glass 110 with respect to the camera in one or more degrees of freedom. Offsets determined from the shift may then be provided to the image processing algorithms to account for any distortion in images captured by the camera caused by the shifted glass 110.

Using multiple fiducials 120A-120*n* for a camera may allow shifts of the cover glass with respect to the camera to be determined in more degrees of freedom than using just one fiducial 120.

The fiducials 120A-120*n* may be configured to cause effectively the same diffraction pattern 122 on the camera sensor 102, or may be configured to cause different diffraction patterns 122 on the camera sensor 102. If two or more different diffraction patterns 122 are used for a camera, a respective known pattern 124 is applied to image(s) captured by the cameras for each diffraction pattern 122 to detect the peaks corresponding to the diffraction patterns 122.

Curvature and thickness of the cover glass 110 may require that the fiducial patterns 120 required to cause the same diffraction pattern 122 at different locations for the camera are at least slightly different.

Figure 1C:
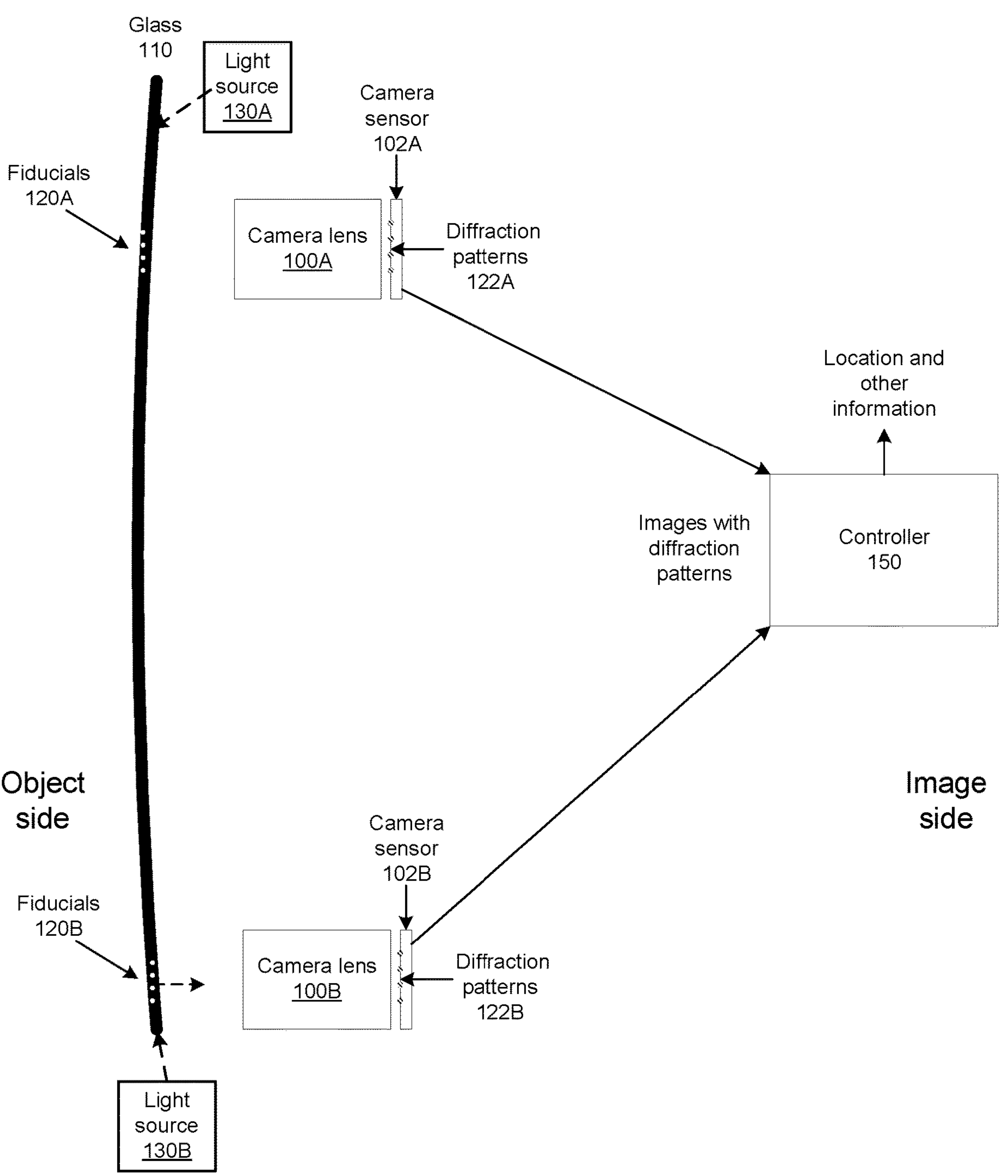
FIG. 1C illustrates a system with multiple cameras in which a glass includes multiple fiducial patterns that cause diffraction patterns on the camera sensors, according to some embodiments.

FIG. 1C illustrates a system with multiple cameras in which a glass includes multiple fiducial patterns that cause diffraction patterns on the respective camera sensors, according to some embodiments. The system may include two or more cameras (three, in this example) each including a camera lens (100A-100C) and camera sensor (102A-102C) located behind a glass 110 of the system (e.g., a cover glass of a head-mounted device (HMD) or an attachable lens). The cameras may include different kinds of cameras, for example RGB, IR, and NIR cameras. The glass 110 may be, but is not necessarily, curved. Fiducials 120A-120C may be etched or otherwise applied the glass 110 in front of respective camera lenses 100A-100C. Conventionally, the fiducials 120 for a given camera are configured to affect input light from an object field in front of the camera to cause diffraction patterns 122 at an image plane corresponding to a surface of the respective camera sensor 102. Images captured by the camera sensor 102 contain "shadows" that correspond to the diffraction patterns 122 caused by the respective fiducials 120. Embodiments of active illumination methods as described herein that use one or more active light sources 130 that inject light into the cover glass 110, or alternatively that reflect light off the cover glass 110, may instead or also be used to strengthen the signals from the fiducial patterns. The light injected by the light sources may include light in the visible, IR, or NIR portions of the spectrum, depending on the types of cameras used.

The fiducial patterns 120 required to cause the same diffraction pattern for two different cameras may differ depending on one or more factors including but not limited to curvature and thickness of the glass 110 at the cameras, distance of the camera lenses 100 from the glass 100, optical characteristics of the cameras (e.g., F-number, focal length, defocus distance, etc.), and type of camera (e.g., visible light vs. IR cameras).

One or more images captured by a camera may be analyzed by controller 150 by applying the known pattern(s) 124 to the image(s) to detect centroids of the diffraction patterns 122 in the image(s). The locations of the detected centroids may then be compared to the calibrated locations for the glass 110 to determine shift of the glass 110 with respect to the camera in multiple degrees of freedom. Offsets determined from the shift may then be provided to the image processing algorithms to account for any distortion in images captured by the camera caused by the shifted glass 110.

In some embodiments, peaks from images captured by two or more of the cameras in the system may be collected and analyzed by controller 150 together to determine overall alignment information for the cover glass 110. For example, if the glass 110 shifts in one direction and the cameras are all stationary, the same shift should be detected across all cameras 110. If there are differences in the shifts across the cameras, bending or other distortion of the glass 110 may be detected.

Figure 2:
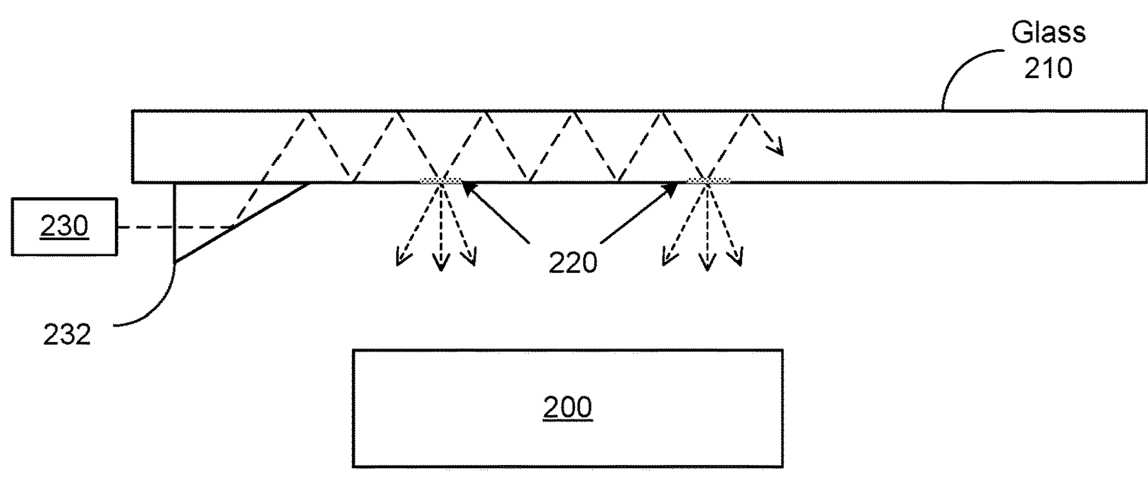
FIG. 2 illustrates a system in which a light source and a prism are used to inject light into a cover glass to provide active illumination of a fiducial pattern, according to some embodiments., according to some embodiments.

FIG. 2 illustrates a system in which a light source and a prism are used to inject light into a cover glass to provide active illumination of a fiducial pattern, according to some embodiments. In these embodiments, a light source 230 and a prism 232 are used to inject light into the cover glass 210 (or alternatively into a diffractive optical element (DOE) embedded in a cover glass). The light may be propagated through the cover glass 210 via TIR. The fiducial pattern may be etched into the camera-facing surface of the cover glass 210, or alternatively may be provided by a diffuser film. A portion of the light being propagated through the cover glass 210 may exit the cover glass at the etched spots 220 of the fiducial pattern in the glass 210 towards the camera 200. VCSEL, LED, or other light sources 220 may be used, and the light may be in any of various wavelengths including visible, IR, and NIR wavelengths, with the camera 200 configured to capture light in the appropriate wavelength. The prism 232 may be a low-cost, high-efficiency incoupling prism, for example a 22.5-degree prism. Light may travel at 45 degrees within the cover glass 210 due to TIR. Light may be recycled from the two end surfaces of the cover glass 210 due to TIR. In some embodiments, critical angle of the cover glass 210 is 41.1 degrees. Light will escape from the etched or diffuser film areas 220 and provide a near field illumination source. In some embodiments, the illumination source may be far field if gratings are used rather than diffuser film.

Figure 3:
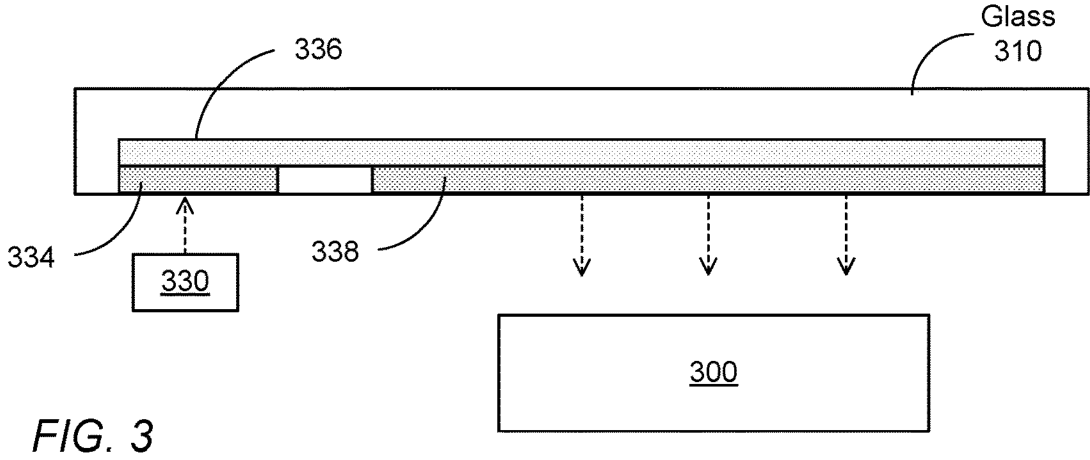
FIG. 3 illustrates a system that uses a light source and a diffractive optical element (DOE) to provide active illumination of a fiducial pattern, according to some embodiments.

FIG. 3 illustrates a system that uses a diffractive optical element (DOE) to provide active illumination of a fiducial pattern, according to some embodiments. In these embodiments, a diffractive optical element (DOE) 336 such as a waveguide may be embedded in or on the surface of the cover glass 310. Light is injected from a light source 334 into the DOE 336 through an in-couple grating 334 (entrance pupil) and exits the DOE 336 through an out-couple grating 338 (exit pupil) towards the camera 300. The out-couple grating 338 acts as the exit pupil and thus as the entrance pupil for the camera 300 itself. The DOE 336 may be designed to limit outward light transmission. The fiducial pattern may be etched or printed on the surface of the cover glass 310 at the out-couple grating 338, or alternatively may be integrated in the out-couple grating 338. VCSEL, LED, or other light sources 330 may be used, and the light may be in any of various wavelengths including visible, IR, and NIR wavelengths, with the camera 300 configured to capture light in the appropriate wavelength.

Figure 4:
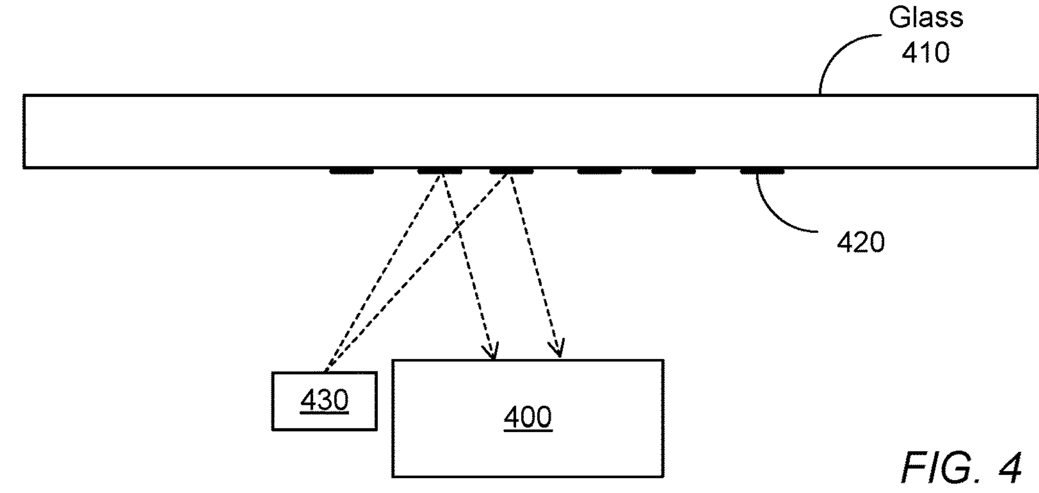
FIG. 4 illustrates a system that uses a light source and a reflective coating on a surface of the cover glass to provide active illumination of a fiducial pattern, according to some embodiments.

FIG. 4 illustrates a system that uses a reflective coating on a surface of the cover glass to provide active illumination of a fiducial pattern, according to some embodiments. In these embodiments, a reflective coating on a surface of the cover glass 410 is used to form the fiducial pattern 420. The coating may be applied the surface, and laser ablation or some other method may be used to remove unneeded portions of the coating, leaving the fiducial pattern 420. Light from a light source 430 is directed towards the surface, and a portion of the light is reflected off the fiducial pattern 420 towards the camera 400. Some embodiments may use a retroreflective material as a coating; retroreflective materials have the property of returning directed light beams back to the source. VCSEL, LED, or other light sources 430 may be used, and the light may be in any of various wavelengths including visible, IR, and NIR wavelengths, with the camera 400 configured to capture light in the appropriate wavelength.

In the systems shown in FIGS. 2 through 4, some embodiments may turn on the light source only for a short time (e.g., 1/30 of a second), and may flag the corresponding frame as "disregard" to downstream consumers, allowing some algorithms to ignore the frame. In some embodiment, the light source may be a synchronized light source that is pulsed to match the camera exposure time and to thus reduce power consumption.

Figure 5:
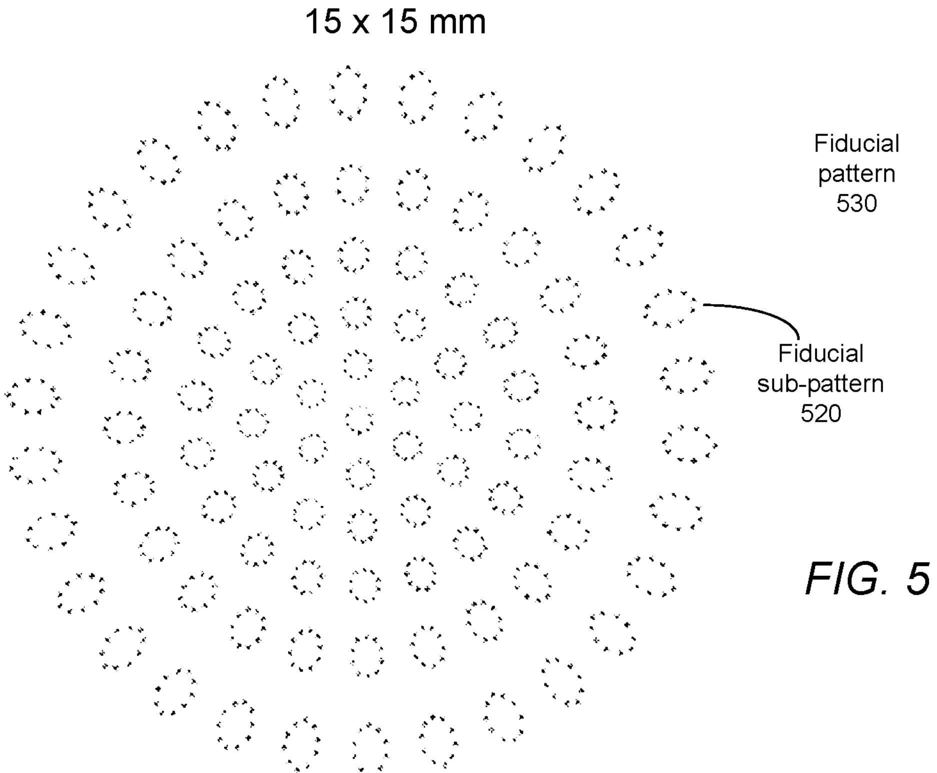
FIG. 5 illustrates an example fiducial pattern that includes two or more rings of sub-patterns, according to some embodiments.

FIG. 5 illustrates an example fiducial pattern 530 that includes two or more rings of sub-patterns 520, according to some embodiments. This example fiducial pattern 530 is circular; however, other geometric or irregular shapes may be used. The fiducial pattern 530 may include more or fewer sub-patterns 520, and the sub-patterns 520 can be otherwise arranged. This example fiducial pattern 530 is 15×15 millimeters, but fiducial patterns 530 may be larger or smaller. The fiducial pattern 530 is configured to affect light from an active light source as described herein to cause a diffraction pattern at an image plane corresponding to a surface of a camera sensor.

Figure 6:
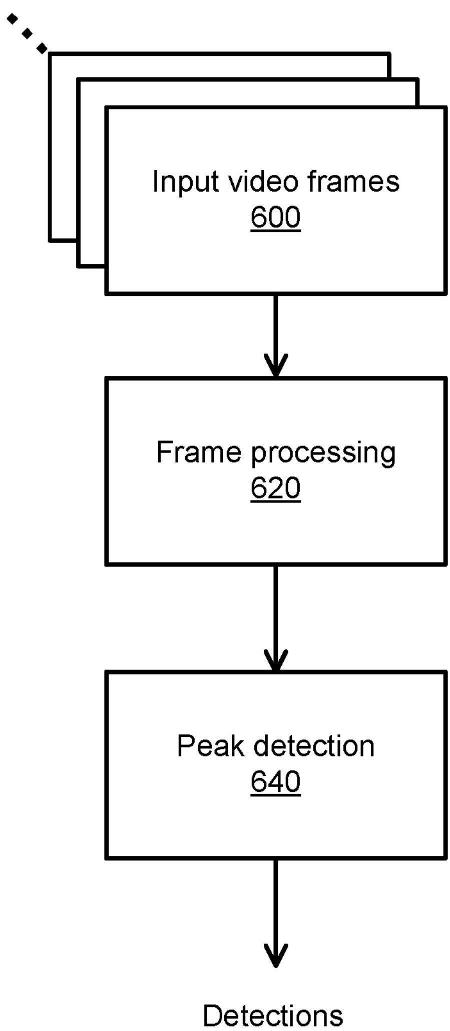
FIG. 6 illustrates the processing of input images to extract centroid or peak information from diffraction patterns in the images, according to some embodiments.

FIG. 6 illustrates the processing of input images to extract centroid or peak information from diffraction patterns in the images caused by fiducial patterns on the cover glass that are actively illuminated using one of the methods described herein, according to some embodiments. At 600, multiple frames from video captured by the camera through a glass that includes a fiducial pattern that is actively illuminated using one of the methods described herein are collected and input to the process. In some embodiments, the frames may be filtered to remove the background. At 620, a technique (for example, a deconvolution technique) is performed with a known pattern for the fiducial pattern to recover the response. Additional filtering may be performed. Peak detection 640 is then performed to detect the centroids of the diffraction pattern caused by the actively illuminated fiducial pattern on the cover glass.

FIGS. 7 through 10 illustrate several example methods for creating fiducial patterns as described herein on or in a glass or plastic optical clement or substrate, which may be a cover glass, attachable lens, or other transparent optical element. Note that some methods may work well for glass elements, while others may work well for plastic elements. The fiducial patterns may be created on the inside (camera facing) surface of the cover glass.

Figure 7:
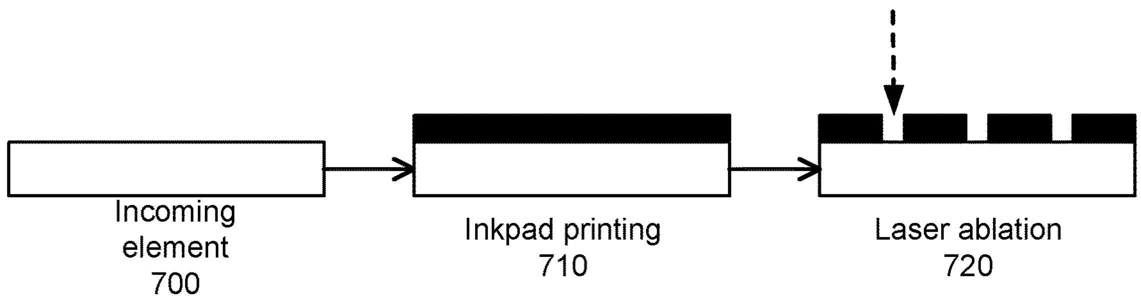
FIG. 7 illustrates a pad print and laser ablation process for generating fiducial patterns, according to some embodiments.

FIG. 7 illustrates a pad print and laser ablation process for generating fiducial patterns, according to some embodiments. An incoming glass or plastic element 700 undergoes an inkpad printing 710. Laser ablation 720 is then used to etch the fiducial pattern in the ink. The "ink" may be a reflective or retroreflective material.

Figure 8:
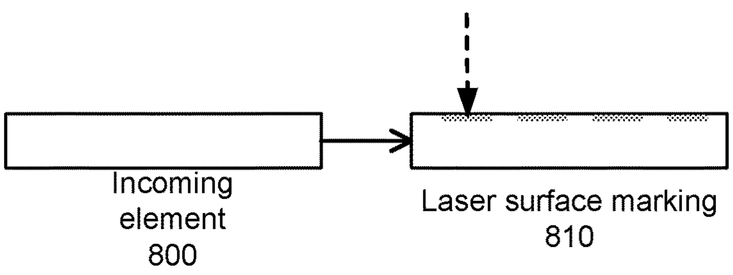
FIG. 8 illustrates a laser surface marking process for generating fiducial patterns, according to some embodiments.

FIG. 8 illustrates a laser surface marking process for generating fiducial patterns, according to some embodiments. An incoming element 800 has the fiducial pattern etched into the surface using a laser subsurface marking technique.

Figure 9:
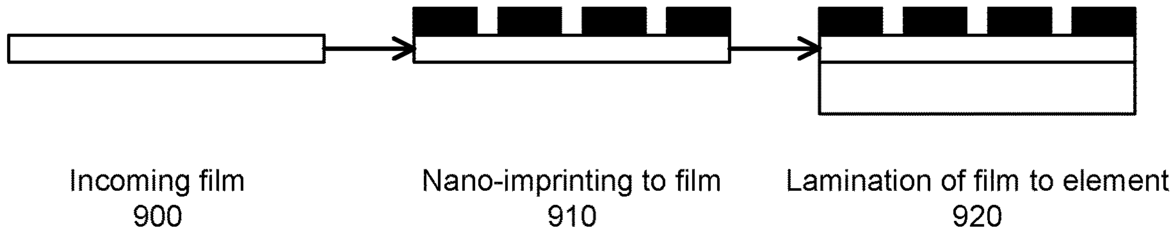
FIGS. 9 and 10 illustrate a nano-imprinting lithography process for generating fiducial patterns, according to some embodiments.
Figure 10:
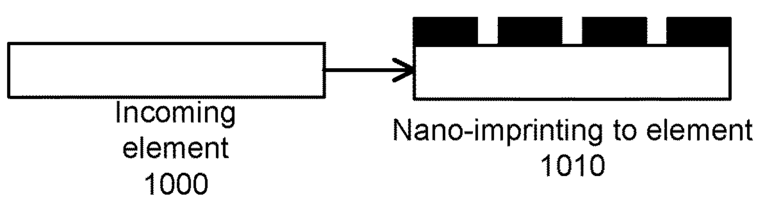

FIGS. 9 and 10 illustrate a nano-imprinting lithography process for generating fiducial patterns, according to some embodiments. In FIG. 9, incoming film 900 has the fiducial pattern printed on it using a nano-imprinting lithography technique. The film is then laminated 920 onto a surface of a glass or plastic element. In FIG. 10, the fiducial pattern is nano-imprinted 1010 directly on a surface of an incoming clement 1000. The material used to make the print may be a reflective or retroreflective material.

Figure 11:
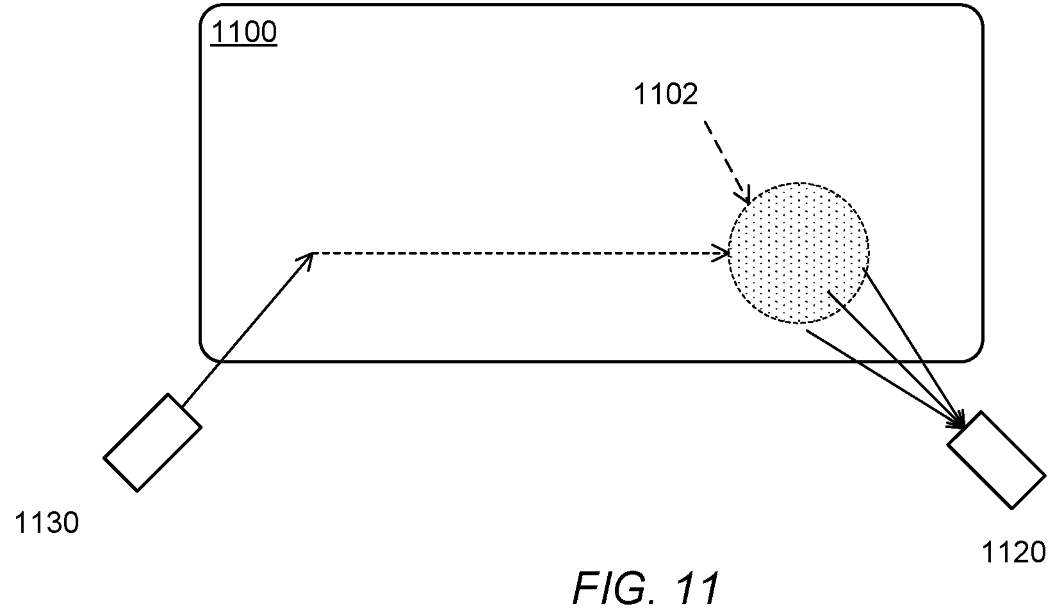
FIG. 11 illustrates example fiducial patterns on a cover glass, according to some embodiments.

FIG. 11 illustrates example fiducial patterns on a cover glass 1100 or other transparent substrate, according to some embodiments. One or more fiducial patterns 1102 as described herein may be formed on a cover glass 1100 using one of the techniques described in FIGS. 7 through 10. In some embodiments, a light source 1130 injects light into the cover glass 1100 through an entrance pupil; the light exits the cover glass through an exit pupil corresponding to the fiducial pattern 1102; the exit pupil corresponds to an entrance pupil of a camera 1120. Alternatively, a light source 1130 may project light onto a surface of the cover glass that includes a fiducial pattern 1102 formed of a reflective or retroreflective material; at least a portion of the light may be reflected off the fiducial pattern 1102 towards the camera 1120. The light from the fiducial pattern 1102 may form a diffraction pattern at the sensor of a respective outward facing camera 1120. Video frames that include the diffraction pattern can be processed to determine extrinsic and/or intrinsic information about the cover glass 1100 and/or camera 1120 using a process as described herein.

Figure 12:
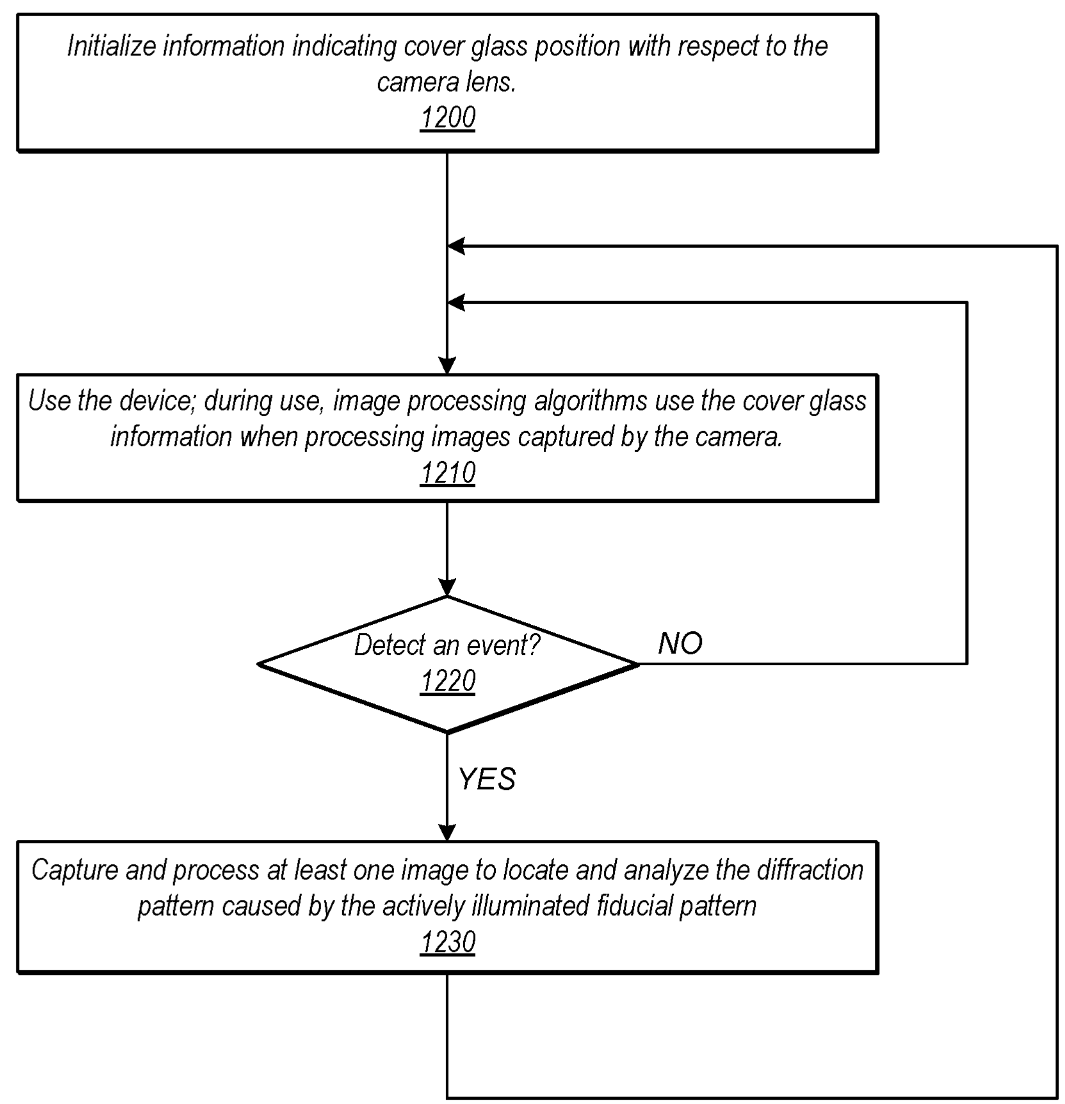
FIG. 12 is a flowchart of a method for checking for shifts in the cover glass of a system, according to some embodiments.

FIG. 12 is a flowchart of a method for detecting shifts in the cover glass of a device using fiducial patterns on the cover glass that are actively illuminated to cause diffraction patterns in images captured by cameras of the device, according to some embodiments. The method of FIG. 12 may, for example, be implemented in the systems as illustrated in FIGS. 1A through IC. The method checks for shifts in the cover glass of a device relative to a camera of the device. In some embodiments, the method may also check for intrinsic changes in the camera which may be caused by drops, temperature changes, etc. As indicated at 1200, information indicating cover glass position with respect to the camera lens may be initialized, for example during a calibration of the device performed during or after manufacturing. As indicated at 1210, during use, algorithms (e.g., image processing algorithms) may use the cover glass position information when processing images captured by the camera. At 1220, the device may detect an event that might affect alignment of the cover glass with respect to the camera lens and/or intrinsic properties of the camera and that thus may require a check to determine if the cover glass has shifted or the camera has changed. For example, the device may detect a sudden shock, for example due to dropping or bumping the device. As another example, a check may be performed each time the device is powered on. As another example, a change in temperature at the camera may be detected. If an event is detected that requires a check, then at 1230 at least one image may be captured and processed to locate and analyze the diffraction patterns and to determine offset(s) of the cover glass with respect to the camera lens or intrinsic changes to the camera based on the diffraction pattern(s) in the image(s) caused by the actively illuminated fiducial pattern(s) on the cover glass.

Figures 13, 14, 15:
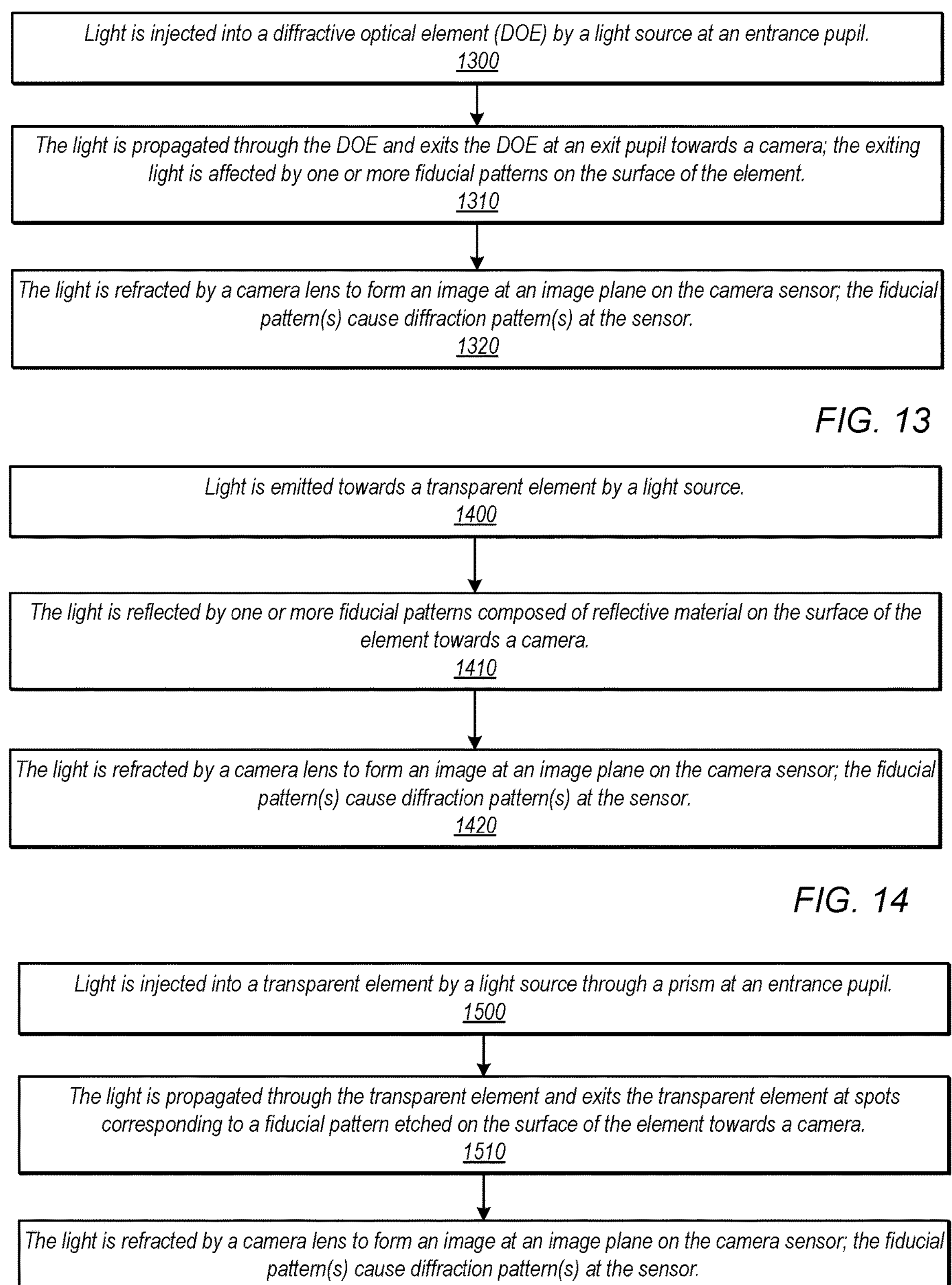
FIG. 13 is a high-level flowchart of a method for using active illumination to illuminate fiducial patterns on a cover glass or transparent substrate to thus form a diffraction pattern at a camera sensor, according to some embodiments.
FIG. 14 is a high-level flowchart of another method for using active illumination to illuminate fiducial patterns on a cover glass or transparent substrate to thus form a diffraction pattern at a camera sensor, according to some embodiments.
FIG. 15 is a high-level flowchart of yet another method for using active illumination to illuminate fiducial patterns on a cover glass or transparent substrate to thus form a diffraction pattern at a camera sensor, according to some embodiments.

FIG. 13 is a high-level flowchart of a method for using active illumination to illuminate fiducial patterns on a cover glass or transparent substrate to thus form a diffraction pattern at a camera sensor, according to some embodiments. The method of FIG. 13 may be performed in the system as illustrated in FIG. 3. As indicated at 1300, light is injected into a diffractive optical clement (DOE) by a light source at an entrance pupil. As indicated at 1310, the light is propagated through the DOE and exits the DOE at an exit pupil towards a camera; the exiting light is affected by one or more fiducial patterns on the surface of the element. As indicated at 1320, the light is refracted by a camera lens to form an image at an image plane on the camera sensor; the fiducial pattern(s) cause diffraction pattern(s) at the sensor.

FIG. 14 is a high-level flowchart of another method for using active illumination to illuminate fiducial patterns on a cover glass or transparent substrate to thus form a diffraction pattern at a camera sensor, according to some embodiments. The method of FIG. 14 may be performed in the system as illustrated in FIG. 4. As indicated at 1400, light is emitted towards a transparent element by a light source. As indicated at 1410, the light is reflected by one or more fiducial patterns composed of reflective or retroreflective material on the surface of the element towards a camera. As indicated at 1420, the light is refracted by a camera lens to form an image at an image plane on the camera sensor; the fiducial pattern(s) cause diffraction pattern(s) at the sensor.

FIG. 15 is a high-level flowchart of yet another method for using active illumination to illuminate fiducial patterns on a cover glass or transparent substrate to thus form a diffraction pattern at a camera sensor, according to some embodiments. The method of FIG. 15 may be performed in the system as illustrated in FIG. 2. As indicated at 1500, light is injected into a transparent element by a light source through a prism at an entrance pupil. As indicated at 1510, the light is propagated through the transparent element and exits the transparent clement at spots corresponding to a fiducial pattern etched on the surface of the element towards a camera. As indicated at 1520, the light is refracted by a camera lens to form an image at an image plane on the camera sensor; the fiducial pattern(s) cause diffraction pattern(s) at the sensor.

In the methods of FIGS. 13 through 15, some embodiments may turn on the light source only for a short time (e.g., 1⁄30 of a second), and may flag the corresponding frame as "disregard" to downstream consumers, allowing some algorithms to ignore the frame. In some embodiment, the light source may be a synchronized light source that is pulsed to match the camera exposure time and to thus reduce power consumption.

Figure 16:
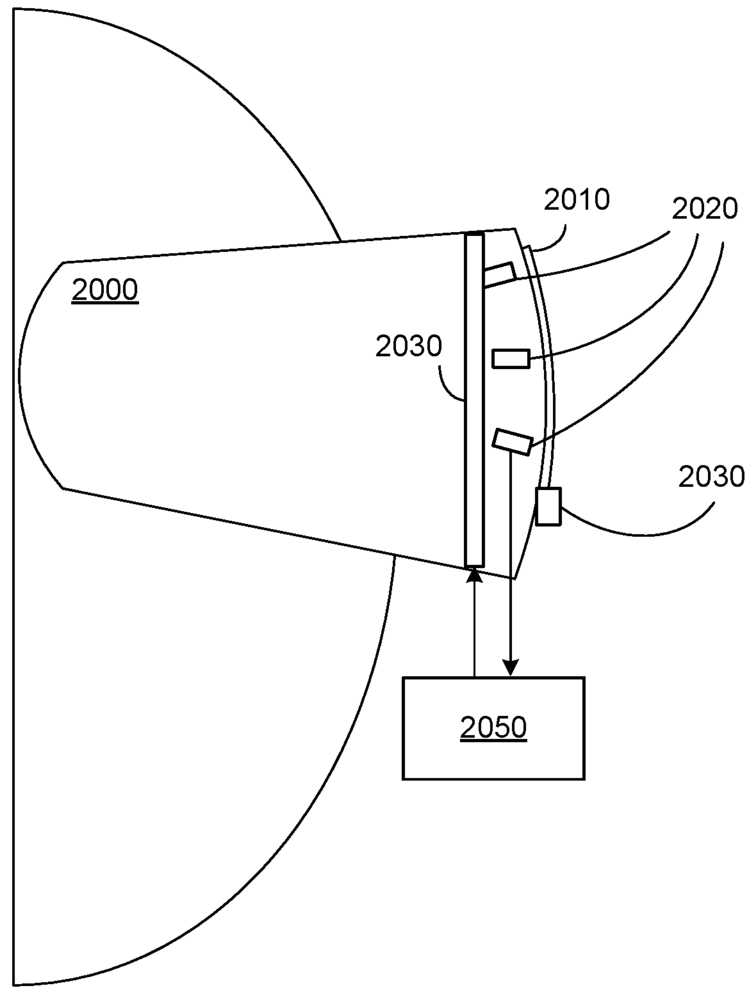
FIG. 16 illustrates an example device in which embodiments may be implemented.

FIG. 16 illustrates an example device in which embodiments may be implemented. As shown in FIG. 16, a device 2000 may include one or more cameras 2020 located behind a flat or curved cover glass 2010. One or more of the cameras 2020 may capture images of the user's environment through the cover glass 2010; the cameras 2020 may include one or more of RGB cameras, infrared (IR) cameras, or other types of cameras or imaging systems. The images captured by the camera(s) 2020 may be processed by algorithms implemented in software and hardware 2050 (e.g., processors (system on a chip (SOC), CPUs, image signal processors (ISPs), graphics processing units (GPUs), encoder/decoders (codecs), etc.), memory, etc.) generate and render frames that include virtual content that are displayed (e.g., on display screen(s) 2030) by the device 2000 for viewing by the user. The image processing software and hardware 2050 may be implemented on the device 2000, on a base station that communicates with the device 2000 via wired and/or wireless connections, or on a combination of the device 2000 and a base station. The image processing algorithms may be sensitive to any distortion in the captured images, including distortion introduced by the cover glass 2010. Alignment of the cover glass 2010 with respect to the camera(s) 2020 may be calibrated at an initial time $t_0$, and this cover glass alignment information may be provided to the image processing algorithms to account for any distortion caused by the cover glass 2010. However, the cover glass 2010 may shift or become misaligned with the cameras 2020 during use, for example by bumping or dropping the device 2000 (extrinsic effects). In addition, a camera 2020 may be affected by bumping, temperature changes, etc. (intrinsic effects).

In some embodiments, fiducial patterns that cause diffraction patterns at the camera 2020 sensors may be etched or otherwise applied to the cover glass 2010 in front of the camera(s) 2020 of the device 2000. For example, in some embodiments, a fiducial pattern may include one or more sub-patterns of dot-like markers that are generated or applied on the transparent glass or plastic material of the cover glass. As necessary (e.g., each time the device 2000 is turned on, or upon detecting a sudden jolt or shock to the device 2000), one or more images captured by the camera(s) 2000 may be analyzed using known patterns applied to the image(s) to detect peaks (centroids of the diffraction patterns caused by the fiducial patterns on the cover glass) in the images. Locations of these centroids may then be compared to the calibrated alignment information for the cover glass 2010 to determine shifts of the cover glass 2010 with respect to the camera(s) in one or more degrees of freedom.

Conventionally, using passive methods, the fiducials on a cover glass effectively cast a shadow on the camera sensor, which shows up in images captured by the camera. Embodiments of a near surface active calibration system as described herein that provide active illumination for fiducial patterns by using a synchronized light source 2030 (or light sources) in a reflection or diffraction configuration to route light through (or reflect light off) the cover glass 2010 back into the camera 2020 sensor(s). Some embodiments may use a diffractive optical element in or on a curved (or flat) cover glass 2010 component to perform active calibration. Some embodiments may use a simple LED 2030 and in-couple grating (IGC) near a camera 2020 to project light into the camera 2020 at opportune times to allow for camera extrinsic and/or intrinsic calibration. Extrinsic generally refers to alignment of the camera 2020 within the device 2000 and specifically with regard to the cover glass 2010. Intrinsic generally refers to internal calibration of the camera 2020 components.

One or more fiducial patterns may be provided on the cover glass 2010. Using multiple (e.g., at least three) fiducials for a camera 2020 may allow shifts of the cover glass 2010 with respect to the camera 2020 to be determined in more degrees of freedom.

For a given camera 2020, if more than one fiducial pattern is used (i.e., etched or printed on the cover glass in front of the camera 2020), the fiducial patterns may be configured to cause effectively the same diffraction pattern on the camera sensor, or may be configured to cause different diffraction patterns on the camera sensor. If two or more different diffraction patterns are used for a camera 2020, a respective known pattern is applied to image(s) captured by the camera 2020 for each diffraction pattern to detect the peaks corresponding to the diffraction patterns. Further, the same or different diffraction patterns may be used for different ones of the device 2000's cameras 2020.

Curvature and thickness of the cover glass 2010 may require that the fiducial patterns required to cause the same diffraction pattern at different locations for a given camera 2020 are at least slightly different. Further, the fiducial patterns required to cause the same diffraction pattern for two different cameras 2020 may differ depending on one or more factors including but not limited to curvature and thickness of the cover glass 2010 at the cameras 2020, distance of the camera lenses from the cover glass 2010, optical characteristics of the cameras 2020 (e.g., F-number, focal length, defocus distance, etc.), and type of camera 2020 (e.g., visible light vs. IR cameras). Note that, if a given camera 2020 has one or more variable settings (e.g., is a zoom-capable camera and/or has an adjustable aperture stop), the method may require that the camera 2020 be placed in a default setting to capture images that include usable diffraction pattern(s) caused by fiducials on the cover glass 2020.

In some embodiments, fiducial pattern information from images captured by two or more cameras 2020 of the device 2000 may be collected and analyzed together to determine overall alignment information for the cover glass 2010. For example, if the cover glass 2010 shifts in one direction and the cameras 2020 are all stationary, the same shift should be detected across all cameras 2020. If there are differences in the shifts across the cameras 2020, bending or other distortion of the cover glass 2010 may be detected.

In some embodiments, fiducial patterns may instead or also be used to encode information about a cover glass 2010, for example prescription information, serial numbers, etc. This information may be recovered from the diffraction patterns captured at the cameras 2020 and used, for example, to make mechanical or software adjustments in the system to adapt the system to the particular cover glass.

Extended Reality

A real environment refers to an environment that a person can perceive (e.g. see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The following clauses describe example embodiments consistent with the drawings and the above description.

Clause 1. A system, comprising:
- a. a camera comprising a camera lens and an image sensor;
- b. a transparent element on an object side of the camera lens, the transparent element including a fiducial pattern on a camera-facing surface configured to cause a diffraction pattern in images formed by the camera lens at a surface of the image sensor;
- c. a light source configured to illuminate the fiducial pattern to strengthen the signal from the fiducial pattern at the image sensor; and
- d. one or more processors configured to process one or more images including the diffraction pattern captured by the camera to extract the fiducial pattern.

Clause 2. The system as recited in clause 1, further comprising a prism attached to the transparent element, wherein the light source is configured to inject light into the prism, and wherein the prism is configured to redirect the light into the transparent element at an entrance pupil.

Clause 3. The system as recited in clause 2, wherein the transparent element is configured to propagate the injected light using total internal reflection (TIR), wherein the fiducial pattern is on a camera-facing surface of the transparent element and comprises a plurality of markers, and wherein a portion of the propagated light exits the transparent element at the markers of the fiducial pattern on the transparent element towards the camera lens.

Clause 4. The system as recited in clause 3, wherein the markers of the fiducial pattern are formed on the surface of the transparent element by laser etching or are formed of a diffuser film on the surface of the transparent element.

Clause 5. The system as recited in clause 1, wherein the transparent element comprises:

a. a diffractive optical element;

b. an in-couple grating corresponding to an entrance pupil; and c. an out-couple grating corresponding to an exit pupil, wherein the fiducial pattern is formed on the transparent element at the exit pupil;

d. wherein the light source is configured to inject light at the in-couple grating;

e. wherein the diffractive optical element is configured to transmit the light to the out-couple grating; and f. wherein the transmitted light exits the transparent element at the exit pupil towards the camera lens to illuminate the diffraction pattern.

Clause 6. The system as recited in clause 1, wherein the light source is configured to emit light towards the fiducial pattern on the surface of the transparent element, and wherein the fiducial pattern is configured to reflect at least a portion of the light back towards the camera lens.

Clause 7. The system as recited in clause 6, wherein the fiducial pattern is formed of a reflective or retroreflective material on the surface of the transparent element.

Clause 8. The system as recited in clause 1, wherein the light source is a synchronized light source that is pulsed to match exposure time of the camera.

Clause 9. The system as recited in clause 1, wherein the light source is a light-emitting diode (LED) light source or a vertical cavity surface emitting laser (VCSEL) light source.

Clause 10. The system as recited in clause 1, wherein the light source is a visible light, infrared (IR) light, or near-infrared (NIR) light source, and wherein the camera is configured to capture light in a corresponding wavelength of the light source.

Clause 11. The system as recited in clause 1, wherein the one or more processors are further configured to:

a. determine offsets of the transparent element with respect to the camera lens from the extracted diffraction pattern; and b. apply the determined offsets to one or more images captured by the camera during processing of the one or more images to account for distortion in the one or more images caused by a corresponding shift in the transparent element with respect to the camera lens.

Clause 12. The system as recited in clause 1, wherein the one or more processors are further configured to detect defects on the transparent element from the extracted diffraction pattern.

Clause 13. The system as recited in clause 1, wherein the one or more processors are further configured to detect intrinsic changes in the camera from the extracted diffraction pattern.

Clause 14. The system as recited in clause 1, wherein the transparent element is a cover glass.

Clause 15. The system as recited in clause 14, wherein the camera, the light source, and the cover glass are components of a head-mounted device (HMD).

Clause 16. The system as recited in clause 1, wherein the transparent element is composed of a glass or plastic material.

Clause 17. The system as recited in clause 1, wherein the fiducial pattern is formed on a surface of the transparent element using a pad print and laser ablation process.

Clause 18. The system as recited in clause 1, wherein the fiducial pattern is formed on a surface of the transparent element using a laser surface marking process.

Clause 19. The system as recited in clause 1, wherein the fiducial pattern is formed on a surface of the transparent element using a nano-imprinting lithography process.

Clause 20. The system as recited in clause 1, wherein the fiducial pattern is formed on a film using a nano-imprinting lithography process, and wherein the film is laminated onto a surface of the transparent element.

Clause 21. A method, comprising:

a. illuminating, by a light source, a fiducial pattern on a surface of a transparent element on an object side of a camera lens;

b. causing, by the illuminated fiducial pattern, a diffraction pattern in images formed by the camera lens at a surface of an image sensor;

c. capturing, by the image sensor, one or more images including the diffraction pattern; and d. processing, by one or more processors, one or more images including the diffraction pattern captured by the camera to extract the fiducial pattern;

e. wherein the light source illuminating the fiducial pattern strengthens the signal from the fiducial pattern at the image sensor.

Clause 22. The method as recited in clause 21, wherein illuminating, by a light source, a fiducial pattern on a surface of a transparent element on an object side of a camera lens comprises:

a. injecting, by the light source, the light into a prism attached to the transparent element; and b. redirecting, by the prism, the light into the transparent element at an entrance pupil.

Clause 23. The method as recited in clause 22, wherein the fiducial pattern is on a camera-facing surface of the transparent element and comprises a plurality of markers, the method further comprising propagating, by the transparent element, the injected light using total internal reflection (TIR), wherein a portion of the propagated light exits the transparent element at the markers of the fiducial pattern on the transparent element towards the camera lens.

Clause 24. The method as recited in clause 23, wherein the markers of the fiducial pattern are formed on the surface of the transparent element by laser etching or are formed of a diffuser film on the surface of the transparent element.

Clause 25. The method as recited in clause 21, wherein illuminating, by a light source, a fiducial pattern on a surface of a transparent element on an object side of a camera lens comprises:

a. injecting, by the light source, the light into an in-couple grating corresponding to an entrance pupil;

b. transmitting, by a diffractive optical element the light to an out-couple grating corresponding to an exit pupil;

c. wherein the transmitted light exits the transparent element at the exit pupil towards the camera lens to illuminate the diffraction pattern.

Clause 26. The method as recited in clause 21, wherein illuminating, by a light source, a fiducial pattern on a surface of a transparent element on an object side of a camera lens comprises emitting, by the light source, light towards the fiducial pattern on the surface of the transparent element, wherein the fiducial pattern is configured to reflect at least a portion of the light back towards the camera lens.

Clause 27. The method as recited in clause 26, wherein the fiducial pattern is formed of a reflective or retroreflective material on the surface of the transparent element.

Clause 28. The method as recited in clause 21, further comprising pulsing the light source to match exposure time of the camera.

Clause 29. The method as recited in clause 21, wherein the light source is a light-emitting diode (LED) light source or a vertical cavity surface emitting laser (VCSEL) light source.

Clause 30. The method as recited in clause 21, wherein the light source is a visible light, infrared (IR) light, or near-infrared (NIR) light source, and wherein the camera is configured to capture light in a corresponding wavelength of the light source.

Clause 31. The method as recited in clause 30, further comprising a. determining, by the one or more processors, a shift of the transparent element with respect to the camera lens from the extracted pattern; and b. adjusting processing of one or more additional images captured by the camera to account for the determined shift in the transparent element with respect to the camera lens.

Clause 32. The method as recited in clause 21, further comprising detecting defects on the transparent element from the extracted diffraction pattern.

Clause 33. The method as recited in clause 21, further comprising detecting intrinsic changes in the camera from the extracted diffraction pattern.

Clause 34. The method as recited in clause 21, wherein the transparent element is a cover glass composed of a glass or plastic material, and wherein the camera, the light source, and the cover glass are components of a head-mounted device (HMD).

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:

a camera comprising a camera lens and an image sensor;

a transparent element on an object side of the camera lens, the transparent element including a fiducial pattern on a camera-facing surface configured to cause a diffraction pattern in images formed by the camera lens at a surface of the image sensor;

a light source configured to illuminate the fiducial pattern to strengthen the signal from the fiducial pattern at the image sensor;

wherein the camera is configured to capture light passing through the transparent element and fiducial pattern distinct from light from the light source; and one or more processors configured to process one or more images including the diffraction pattern captured by the camera to extract the fiducial pattern.

2. The system as recited in claim 1, further comprising a prism attached to the transparent element, wherein the light source is configured to inject light into the prism, and wherein the prism is configured to redirect the light into the transparent element at an entrance pupil.

3. The system as recited in claim 2, wherein the transparent element is configured to propagate the injected light using total internal reflection (TIR), wherein the fiducial pattern is on a camera-facing surface of the transparent element and comprises a plurality of markers, and wherein a portion of the propagated light exits the transparent element at the markers of the fiducial pattern on the transparent element towards the camera lens.

4. The system as recited in claim 3, wherein the markers of the fiducial pattern are formed on the surface of the transparent element by laser etching or are formed of a diffuser film on the surface of the transparent element.

5. The system as recited in claim 1, wherein the transparent element comprises:

a diffractive optical element;

an in-couple grating corresponding to an entrance pupil; and an out-couple grating corresponding to an exit pupil, wherein the fiducial pattern is formed on the transparent element at the exit pupil;

wherein the light source is configured to inject light at the in-couple grating;

wherein the diffractive optical element is configured to transmit the light to the out-couple grating; and wherein the transmitted light exits the transparent element at the exit pupil towards the camera lens to illuminate the diffraction pattern.

6. The system as recited in claim 1, wherein the light source is configured to emit light towards the fiducial pattern on the surface of the transparent element, and wherein the fiducial pattern is configured to reflect at least a portion of the light back towards the camera lens.

7. The system as recited in claim 6, wherein the fiducial pattern is formed of a reflective or retroreflective material on the surface of the transparent element.

8. The system as recited in claim 1, wherein the light source is a synchronized light source that is pulsed to match exposure time of the camera.

9. The system as recited in claim 1, wherein the light source is a light-emitting diode (LED) light source or a vertical cavity surface emitting laser (VCSEL) light source.

10. The system as recited in claim 1, wherein the light source is a visible light, infrared (IR) light, or near-infrared (NIR) light source, and wherein the camera is configured to capture light in a corresponding wavelength of the light source.

11. The system as recited in claim 1, wherein the one or more processors are further configured to:

determine offsets of the transparent element with respect to the camera lens from the extracted diffraction pattern; and apply the determined offsets to one or more images captured by the camera during processing of the one or more images to account for distortion in the one or more images caused by a corresponding shift in the transparent element with respect to the camera lens.

12. The system as recited in claim 1, wherein the one or more processors are further configured to detect defects on the transparent element from the extracted diffraction pattern.

13. The system as recited in claim 1, wherein the one or more processors are further configured to detect intrinsic changes in the camera from the extracted diffraction pattern.

14. The system as recited in claim 1, wherein the transparent element is a cover glass, and wherein the camera, the light source, and the cover glass are components of a head-mounted device (HMD).

15. The system as recited in claim 1, wherein:

the fiducial pattern is formed on a surface of the transparent element using a pad print and laser ablation process, using a laser surface marking process, or using a nano-imprinting lithography process, or the fiducial pattern is formed on a film using a nano-imprinting lithography process, and wherein the film is laminated onto a surface of the transparent element.

16. A method, comprising:

illuminating, by a light source, a fiducial pattern on a surface of a transparent element on an object side of a camera lens;

causing, by the illuminated fiducial pattern, a diffraction pattern in images formed by the camera lens at a surface of an image sensor;

capturing, by the image sensor, one or more images including the diffraction pattern and based on light passing through the transparent element and fiducial pattern distinct from light from the light source; and processing, by one or more processors, one or more images including the diffraction pattern captured by the camera to extract the fiducial pattern;

wherein the light source illuminating the fiducial pattern strengthens the signal from the fiducial pattern at the image sensor.

17. The method as recited in claim 16, wherein the fiducial pattern is on a camera-facing surface of the transparent element and comprises a plurality of markers, wherein illuminating the fiducial pattern on the surface of the transparent element comprises:

injecting, by the light source, the light into a prism attached to the transparent element;

redirecting, by the prism, the light into the transparent element at an entrance pupil; and propagating, by the transparent element, the injected light using total internal reflection (TIR), wherein a portion of the propagated light exits the transparent element at the markers of the fiducial pattern on the transparent element towards the camera lens.

18. The method as recited in claim 16, wherein illuminating the fiducial pattern on the surface of the transparent element comprises:

injecting, by the light source, the light into an in-couple grating corresponding to an entrance pupil; and transmitting, by a diffractive optical element the light to an out-couple grating corresponding to an exit pupil;

wherein the transmitted light exits the transparent element at the exit pupil towards the camera lens to illuminate the diffraction pattern.

19. The method as recited in claim 16, wherein illuminating the fiducial pattern on the surface of the transparent element comprises emitting, by the light source, light towards the fiducial pattern on the surface of the transparent element, wherein the fiducial pattern is formed of a reflective or retroreflective material on the surface of the transparent element and is configured to reflect at least a portion of the light back towards the camera lens.

20. The method as recited in claim 16, wherein the light source is a visible light, infrared (IR) light, or near-infrared (NIR) light source, and wherein the camera is configured to capture light in a corresponding wavelength of the light source, the method further comprising:

determining, by the one or more processors, a shift of the transparent element with respect to the camera lens from the extracted pattern; and adjusting processing of one or more additional images captured by the camera to account for the determined shift in the transparent element with respect to the camera lens.

* * * * *